United States Patent
Jung et al.

(10) Patent No.: US 11,514,212 B2
(45) Date of Patent: Nov. 29, 2022

(54) METHOD OF SIMULATING AUTONOMOUS VEHICLE IN VIRTUAL ENVIRONMENT

(71) Applicant: MORAI, Seongnam-si (KR)

(72) Inventors: Jiwon Jung, Daegu (KR); Jun Hong, Icheon-si (KR)

(73) Assignee: MORAI, Seongnam-si (KR)

( * ) Notice: Subject to any disclaimer, the term of this patent is extended or adjusted under 35 U.S.C. 154(b) by 0 days.

(21) Appl. No.: 17/251,139

(22) PCT Filed: Sep. 18, 2020

(86) PCT No.: PCT/KR2020/012594
§ 371 (c)(1),
(2) Date: Dec. 10, 2020

(87) PCT Pub. No.: WO2021/141206
PCT Pub. Date: Jul. 15, 2021

(65) Prior Publication Data
US 2021/0374308 A1    Dec. 2, 2021

(30) Foreign Application Priority Data

Jan. 6, 2020 (KR) .................. 10-2020-0001206

(51) Int. Cl.
*G06F 17/00*     (2019.01)
*G06F 30/20*     (2020.01)
*G06F 9/455*     (2018.01)

(52) U.S. Cl.
CPC .............. *G06F 30/20* (2020.01); *G06F 9/455* (2013.01)

(58) Field of Classification Search
CPC ..................... G06F 17/5018; G06F 17/5095
USPC ................................................ 703/8
See application file for complete search history.

(56) References Cited

U.S. PATENT DOCUMENTS

| 10,469,282 | B1 | 11/2019 | Konrardy et al. | |
| 2016/0314224 | A1* | 10/2016 | Wei | G05D 1/0088 |
| 2019/0318267 | A1 | 10/2019 | Zhang et al. | |
| 2020/0065443 | A1* | 2/2020 | Liu | G06F 11/3664 |
| 2020/0226226 | A1* | 7/2020 | Zaytsev | G06F 30/15 |

FOREIGN PATENT DOCUMENTS

| JP | 2019-074885 A | 5/2019 |
| KR | 10-2014-0076918 A | 6/2014 |
| KR | 10-2014-0144919 A | 12/2014 |

(Continued)

*Primary Examiner* — Andy Ho
(74) *Attorney, Agent, or Firm* — Dinsmore & Shohl LLP; Yongsok Choi, Esq.

(57) ABSTRACT

Provided herein is a moving object simulation method including: a simulation preprocessing step in which a first server generates environment information for the simulation target, including at least one of road data, nearby vehicle data, nearby pedestrian data, nearby obstacle data, nearby traffic light data, nearby sign data, and event data, for a predetermined period of time; and a simulation step in which a second server calculates sensor unit output data of a simulation target vehicle according to movement of the simulation target vehicle for the predetermined period of time using the environment information, preventing computational overload due to limitations of server resources and promoting quality improvement for algorithm verification.

18 Claims, 7 Drawing Sheets

(56) References Cited

FOREIGN PATENT DOCUMENTS

| KR | 10-2014-0144921 A | 12/2014 |
|---|---|---|
| KR | 10-2016-0105011 A | 9/2016 |
| KR | 10-2017-0132515 A | 12/2017 |
| KR | 10-2018-0086632 A | 8/2018 |
| KR | 10-1880180 B1 | 8/2018 |
| KR | 10-2018-0104947 A | 9/2018 |
| KR | 10-1984762 B1 | 6/2019 |
| KR | 10-1996230 B1 | 7/2019 |
| KR | 10-2019-0114496 A | 10/2019 |
| KR | 10-2042261 B1 | 11/2019 |

* cited by examiner

METHOD OF SIMULATING AUTONOMOUS VEHICLE IN VIRTUAL ENVIRONMENT

TECHNICAL FIELD

The present invention relates to a method of simulating an autonomous vehicle in a virtual environment, and more particularly, to a simulation method for maintaining a resource to be optimized through efficient data processing on a simulator of an autonomous vehicle, which is a virtual environment for verifying a control algorithm of the autonomous vehicle.

BACKGROUND ART

An autonomous vehicle is a vehicle which performs driving without a driver who directly drives the vehicle. In general, such an autonomous vehicle generally follows a driving route based on 2D/3D map information and is configured to measure surrounding objects in real time during driving and change the driving route if a variable occurs.

Also, the autonomous vehicle is autonomously driven according to data recognized from surrounding geographical features and a driving control algorithm processing the data. In the case of perception, the autonomous vehicle is configured to recognize a driving environment such as vehicles, pedestrians, obstacles, and the like existing on a road using a sensor such as a radar, a lidar, a global positioning system (GPS), a camera, and the like mounted on the vehicle. The driving control algorithm may calculate/infer a driving situation based on output data calculated in the perception stage and generate a control signal for components of the vehicle based on the calculated/inferred value.

Here, as disclosed in Korean Patent Laid-Open Publication No. 10-2018-0086632 ("Device and Method for Determining Behavior of Autonomous Vehicle", published on Aug. 1, 2018) or Korean Patent Laid-Open Publication No. 10-2018-0104947 ("Autonomous Vehicle Control System and Method", published on Sep. 27, 2018), autonomous vehicles have been developed to recognize and control a larger amount of information minutely. To this end, in the related art, development has been made such that the driving control algorithm advances to derive an accurate decision given many variables.

Also, the developed driving control algorithm undergoes a verification process before being applied to actual autonomous vehicles, as disclosed in Korean Patent Laid-Open Publication No. 10-1984762 ("Autonomous Vehicle Simulator Using Network Platform", published on Jun. 3, 2019) or Korean Patent Registration No. 10-1996230 ("Method and Device for Providing Test Information for Simulation of Autonomous Vehicle", published on Jul. 4, 2019).

Here, the simulator is configured such that virtual sensors simulating actual sensors obtain data in a virtual environment formed based on a physical engine calculated in real time and process the obtained data according to a driving control algorithm of each autonomous vehicle. The physical engine and the virtual sensors of the simulator and the driving control algorithm need to input/output and calculate a large amount of data. However, in a case in which the amount of data is beyond performance of a processor and out of a processible level of an overall system, resources are not distributed to a part thereof, causing a delay or interruption (or disconnection) in the entire virtual environment.

DISCLOSURE

Technical Problem

An object of the present invention is to provide a method of simulating an autonomous vehicle in a virtual environment, capable of establishing a data set by separately managing a situation in which a more minute driving control algorithm needs to be verified or accurate data is required for a virtual sensor and capable of variously verifying the established data set, thereby generating more accurate sensor part output data, while improving interruption of a simulator.

Technical Solution

According to an exemplary embodiment of the present invention, a moving object simulation method includes: (a) a simulation preprocessing step in which a first server generates environment information for simulation target, including at least one of road data, nearby vehicle data, nearby pedestrian data, nearby obstacle data, nearby traffic light data, nearby sign data, and event data for a predetermined period of time; and (b) a simulation step in which a second server calculates sensor unit output data of a simulation target vehicle according to movement of the simulation target vehicle for the predetermined period of time using the environment information.

The step (b) may be performed after the step (a), the step (a) may further include: a step for storing the environment information, and in the step (b), by using the environment information stored in the step (a), the second server may reduce computational load for simulation.

The first server and the second server may be configured as the same server.

The step (a) and the step (b) may be simultaneously performed, and the environment information used in the step (b) may be received by the second server in real time from the first server, thereby reducing the computational processing load of the second server for simulation.

The first server and the second server may be configured as separate servers.

The environment information may include simulation time data so that the simulation time of the step (a) and the simulation time of the step (b) may be synchronized.

The simulation target vehicle may be configured as an autonomous vehicle.

The sensor unit may include at least one of lidar, radar, GPS, and camera sensors.

The moving object simulation method may further include: receiving simulation configuration information including at least one of simulation target vehicle information, sensor unit information of a simulation target vehicle, and vehicle driving control algorithm information from a user either before or after the step (a).

The simulation target vehicle information may include at least one of a type, shape, size, wheelbase, height, and center of mass of a vehicle.

The sensor unit information of the simulation target vehicle may include at least one of the number, type, specification, and installation position within the vehicle, of a sensor included in the sensor unit.

The vehicle driving control algorithm information may be an algorithm for calculating a driving command of the vehicle based on the sensor unit output data of the simulation target vehicle.

The driving command of the vehicle may include at least one of acceleration, deceleration, full stop, driving direction and turn indicator, and lighting of the vehicle.

In the step (b), the movement of the simulation target vehicle may be controlled based on the calculated output data of the sensor unit of the simulation target vehicle.

According to another exemplary embodiment of the present invention, a moving object simulation system includes: a first server and a second server performing the moving object simulation method described above.

According to another exemplary embodiment of the present invention, a storage medium stores a command for performing the moving object simulation method described above.

Advantageous Effects

In the autonomous vehicle simulation method in a virtual environment according to the configuration of the present invention as described above, since the first server and the second server share the computational load with each other, an interruption of the simulator that occurs as a plurality of computational data are processed may be effectively solved.

In addition, in the present invention, environment information is generated by differentiating, as a data set, information for a predetermined period of time that requires more precise sensor unit output data in the entire operation information, thereby suppressing occurrence of an error of output data due to interruption or delay in a simulator.

In addition, in the present invention, the simulator is continuously operated in the first server and the second server, receives information for a predetermined period of time and reproduces only a section required to be verified, thereby providing an environment in which a plurality of visitors may access the first server to receive required environment information and verify their own algorithms.

BEST MODE

Hereinafter, an autonomous vehicle simulator system according to an exemplary embodiment of the present invention will be described in detail with reference to the accompanying drawings. The drawings are provided as examples in order to convey the spirit of the present invention to those skilled in the art. Therefore, the present invention is not limited to the drawings presented hereinafter and may be embodied in other forms. Throughout the specification, the same reference numbers will be used to refer to the same or like components.

If there are no other definitions for technical terms and scientific terms used here, the technical terms and scientific terms have the meanings commonly understood by those skilled in the art to which the present invention pertains, and in the following description and accompanying drawings, descriptions of known functions and components that may unnecessarily obscure the subject matter will be omitted.

Figure 1:
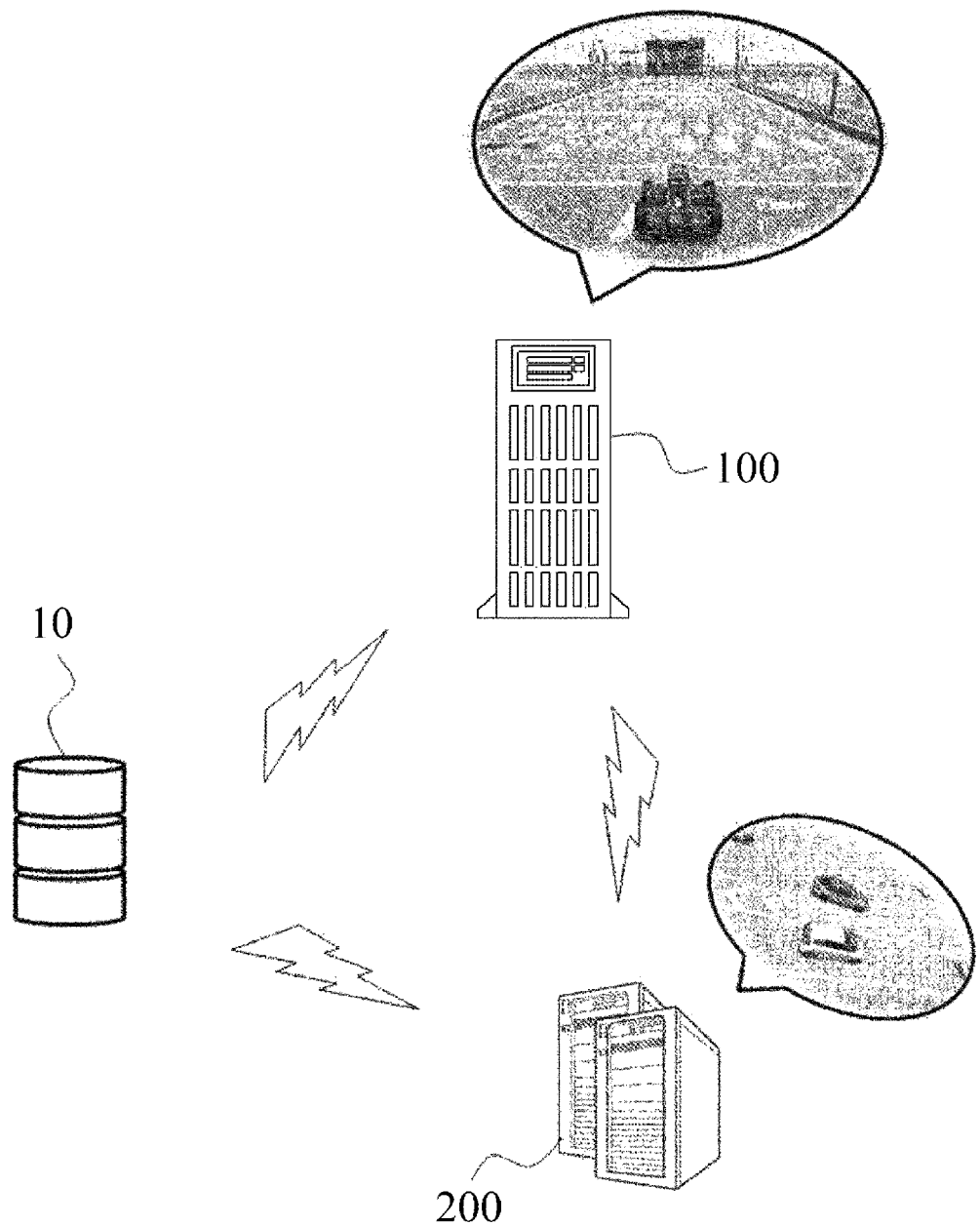
FIG. 1 is a schematic diagram of a system for performing an autonomous vehicle simulation method according to the present invention.

FIG. 1 relates to a system for performing an autonomous vehicle simulation method according to the present invention and FIG. 1 shows a schematic diagram of the system. Referring to FIG. 1, an autonomous vehicle simulation system of the present invention may include a first server 100 and a second server 200 capable of performing data communication with external devices and including a physical engine-based simulator to verify an algorithm for an autonomous vehicle. Here, for data communication, the first server 100 and the second server 200 may be connected to peripheral devices with wires to perform data transmission/reception with other servers or devices or may perform data transmission/reception with remote servers or devices through wireless communication.

In addition, the first server 100 and the second server 200 may perform data communication with each other, and each of the first server 100 and the second server 200 may include an internal storage device to store information for operating a simulator and may be connected to a separate external storage device 10 to perform data input and output.

The first server 100 and the second server 200 may verify a control algorithm of the autonomous vehicle. In addition, data such as geographical features, road types, pedestrians, autonomous vehicles, and weather may be implemented in a virtual environment, and event information data such as a rockslide or a traffic accident may also be provided. In addition, a plurality of vehicle data may be implemented in the virtual environment where some vehicles may be provided so that a driving route is changed according to a surrounding environment based on an input driving algorithm, while other vehicles may be configured to verify a driving algorithm according to a determined driving route. In addition, the first server 100 and the second server 200 may further include an output device connected to the simulator, and the data described above may be visualized in the output device and provided to a user as an image for verification.

The second server 200 may acquire sensor unit output data for a surrounding environment or vehicle arrangements based on a target autonomous vehicle selected in the virtual environment based on a sensor unit simulated in the virtual environment. Here, the sensor unit may include at least one of lidar, radar, GPS, and camera sensors of the autonomous vehicle simulated in the virtual environment. In addition, the sensor unit simulated in the virtual environment may generate measurement data through a processor operation regarding other visualized data associated with the selected autonomous vehicle. This will be described in more detail through various exemplary embodiments of the present invention to be described later.

Embodiment 1

Figure 2:
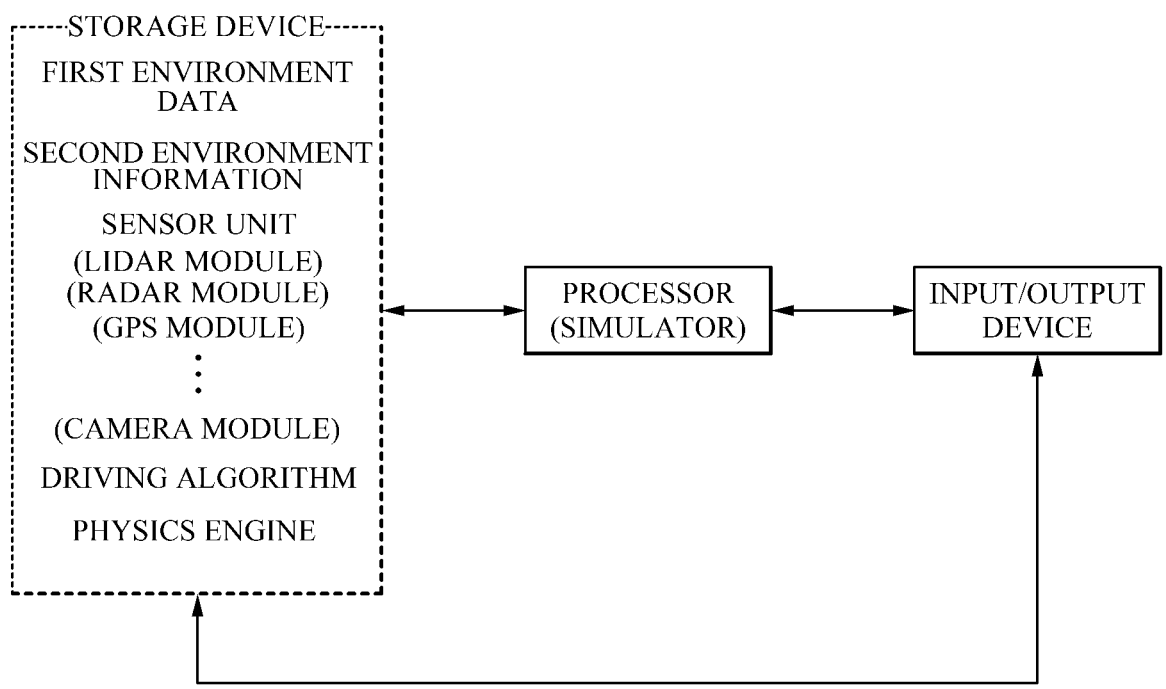
FIG. 2 is a system configuration diagram according to an exemplary embodiment of the autonomous vehicle simulation method.
Figure 3:
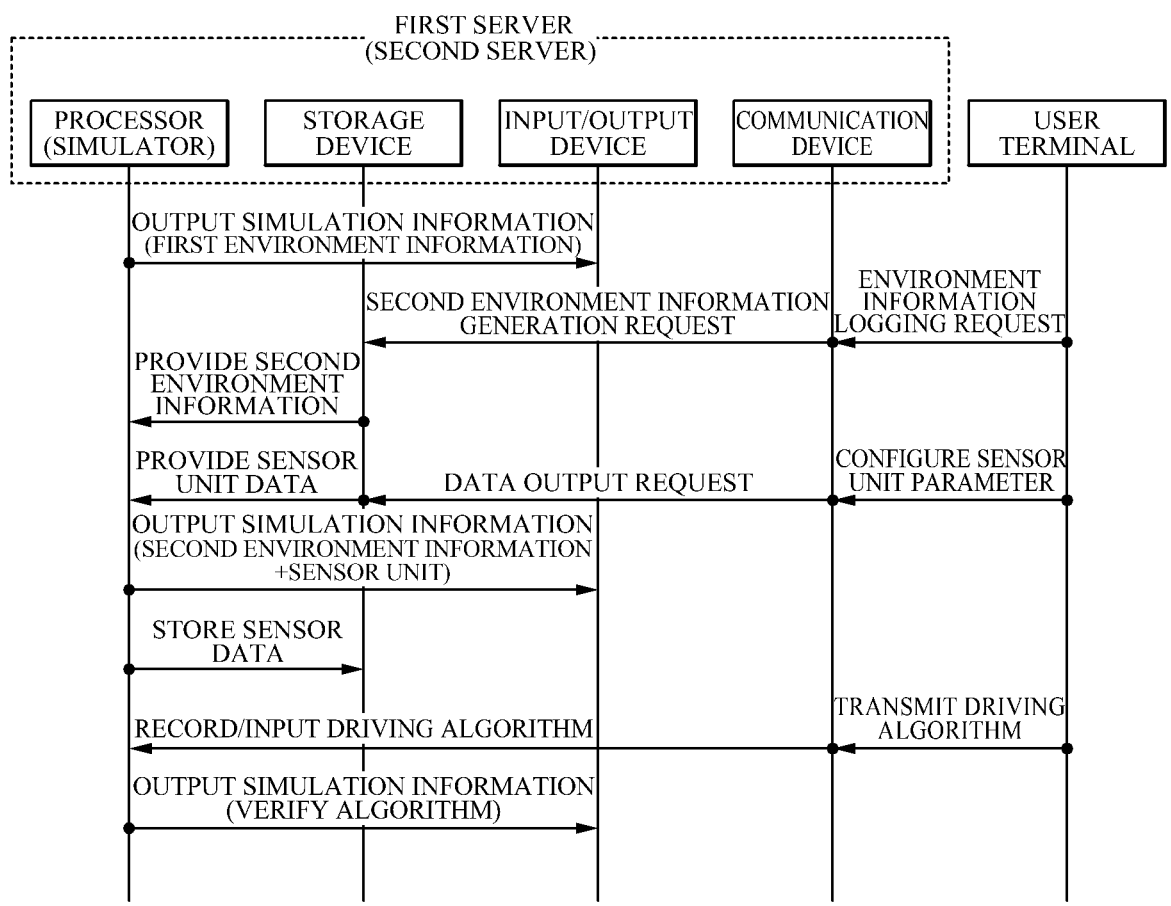
FIGS. 3 and 4 are control flowcharts according to an exemplary embodiment of an autonomous vehicle simulation method.
Figure 4:
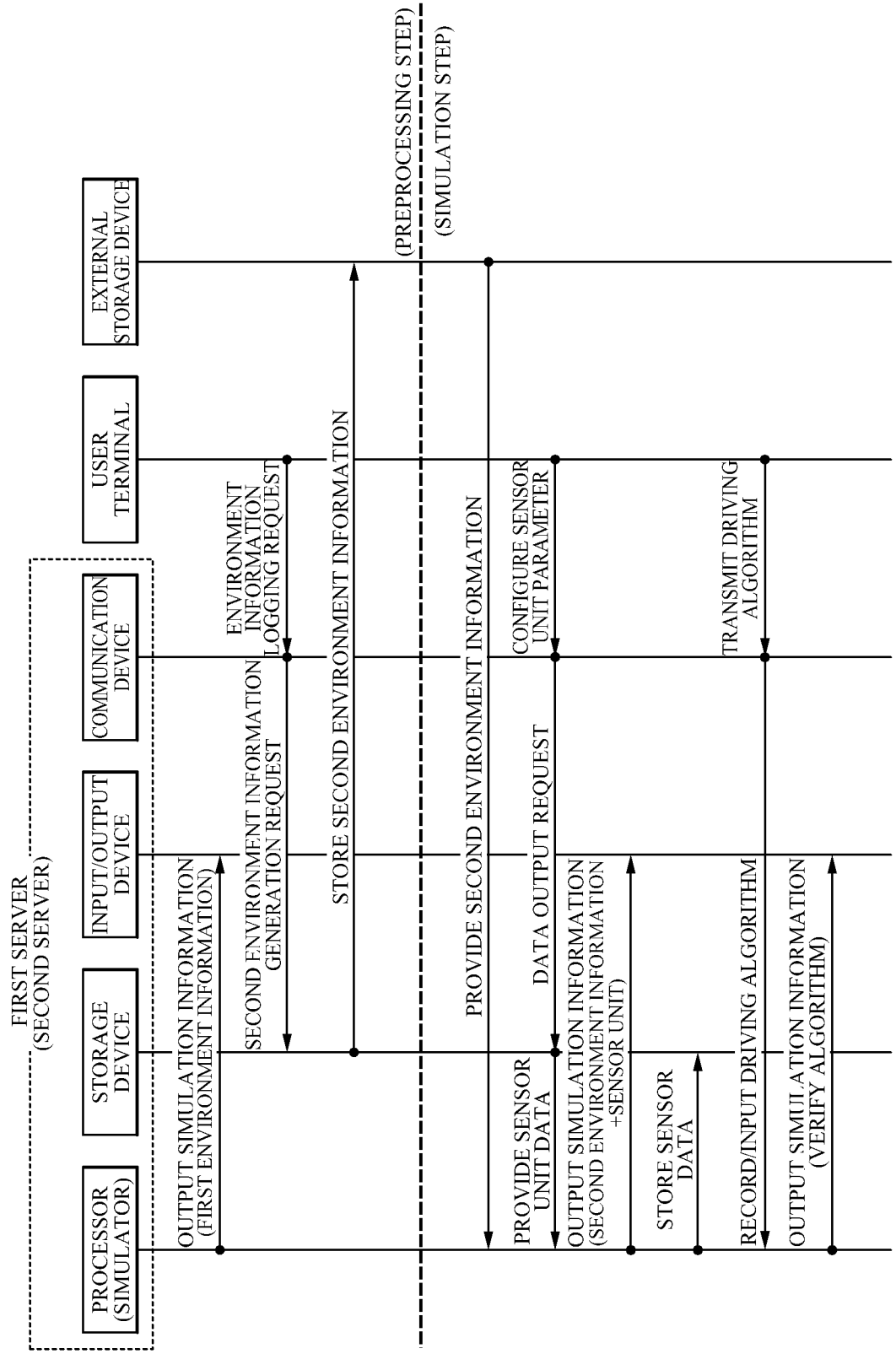

FIGS. 2 to 4 relate to an exemplary embodiment of an autonomous vehicle simulation method according to the present invention, in which FIG. 2 is a system configuration diagram and FIGS. 3 and 4 are control flowcharts of the autonomous vehicle simulation method.

First, referring to FIG. 2, the first server and the second server of the present invention may be configured as the same server, and in this exemplary embodiment, the same first server and second server are collectively referred to as a server. Here, the server may include a storage device, a simulator including a processor controlling/calculating data received from the storage device, and an input/output device receiving data from the outside or outputting data to the outside.

In the server, the storage device provides environment information, a physics engine, information on a virtual sensor simulating an actual sensor (hereinafter, referred to as a "sensor unit"), and a driving control algorithm (hereinafter, referred to as a "driving algorithm") to the processor, control/calculation is performed based on the information provided from the processor, and an output value may be visualized and displayed on the output device or may be stored in the storage device. Here, the various types of information provided from the storage device may be separately stored in a plurality of disks, rather than in one disk, or a part thereof may be provided from the outside.

The environment information stored in the storage device may be divided into first environment information and second environment information, and the second environment information may be a data set including some of the entire data of the first environment information. Here, the first environment information and the second environment information for the simulation target, may include at least one of road data, nearby vehicle data, nearby pedestrian data, nearby obstacle data, nearby traffic light data, nearby sign data, and event data. In addition, the second environment information for the simulation target, may include at least one of road data, nearby vehicle data, nearby pedestrian data, nearby obstacle data, nearby traffic light data, nearby sign data, and event data divided according to an input reference from the first environment information. Here, the input reference may be a predetermined time reference. Here, the predetermined time reference may be an operation time of the simulator when the simulator is operated by the first environment information and calculated information is output, and a region between predetermined times (T1 to T2) based on a real-time clock (RTC) may be determined as the predetermined time reference. In addition, the simulation target may be a vehicle for driving algorithm verification, and the surroundings of said target may be the geographical features that are located within a certain range of a virtual field centered on the vehicle.

Next, a method of simulating an autonomous vehicle according to a case where environment data is stored on an internal storage device of a server will be described in sequence as follows with reference to FIG. 3. First, the simulator of the server may transmit simulation information according to first environment information to the output device to visualize the simulation information through an image. Also, when an environment information logging request from a user terminal is received by a communication device of the server, a second environment information generation request message may be transmitted to the storage device of the server. Here, the second environment information may be configured as a data set divided from the first environment information, and the server of the present invention may control it through a processor or manage data through a separate DBMS. Here, the environment information logging request may be information on data related to an image between the predetermined times T1 to T2 based on a simulation image output in real time.

When the second environment information is generated in the storage device of the server, the simulator operated with the first environment information is stopped and the simulator may be operated based on the second environment information. In addition, the server may provide sensor unit data stored in the storage device to the simulator, and the simulator may calculate sensor data, which is sensor unit output data, through the second environment information and the sensor unit data. The sensor data may be stored in the storage device and then utilized. Here, parameter configuration information for the sensor unit may be input from the user terminal either before or after the step described above, and the sensor unit parameter configuration information may be a control signal regarding which sensor of the entire sensor unit is to be reflected in the simulator. For example, if a total amount of the stored sensor unit is 6, the sensor unit may be controlled in various manners such that only four sensor unit may be set to be reflected in the simulator or all sensor unit may be set to be reflected in the simulator. Further, according to the present invention, the sensor unit information may be input together with the second environment information from the storage device to the simulator. Here, the sensor unit information may include at least one of the number, type, specification, and installation position within the vehicle, and each sensor may have sensor unit data that includes an algorithm to convert the data into a unique output value.

In the present invention, verification may be performed by applying a driving algorithm transmitted from the user terminal or a driving algorithm stored in the storage device to the simulator in which the sensor data is calculated. Here, the simulation information into which the algorithm is input may be displayed in real time through the output device.

Referring to FIG. 4, a method of simulating an autonomous vehicle according to a case in which second environment information is stored in an external storage device will be described as follows. A moving object simulation method of the present invention may include a preprocessing step and a simulation step. In the preprocessing step, second environment information for the simulation target, including at least one of road data, nearby vehicle data, nearby pedestrian data, nearby obstacle data, nearby traffic light data, nearby sign data, and event data for a predetermined period of time may be divided from and then generated, from the first environment information of the storage device, which can be based either on a signal input through the input device of the server or a signal transmitted from the user terminal. The second environment information may be transmitted to an external storage device through the communication device or the output device and may be stored in the external storage device.

When the second environment information making a data set is stored in the external storage device, the server may receive the environment data from the external storage device through the input device or the communication device. Accordingly, the divided second environment information may be provided to a plurality of servers through the external storage device.

If the simulation is performed on the server in real time, environment data may be sorted into data sets in advance if either the real-time video output shows the autonomous vehicle not being operated as intended, or it is a situation where a more granular verification of the algorithm is required. Accordingly, situations in which granular verification should be performed is repeated on the server but several driving algorithms may be input and verified. In addition, in the present invention, more granular data sets, such as third environment information, n-th environment information, and so on, which include the second environment information divided from the first environment information, may be generated.

Embodiment 2

Figure 5:
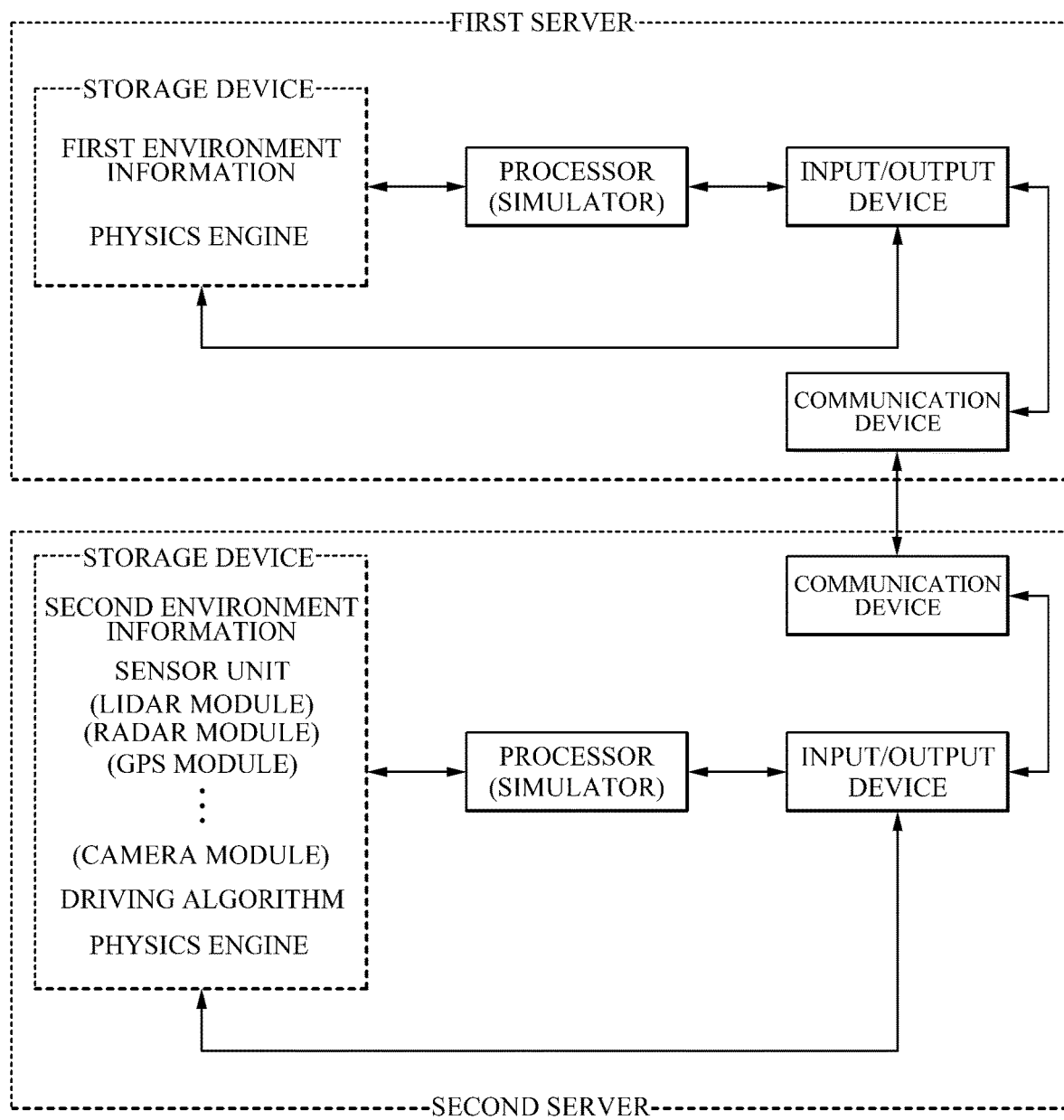
FIG. 5 is a system configuration diagram according to another exemplary embodiment of an autonomous vehicle simulation method.
Figure 6:
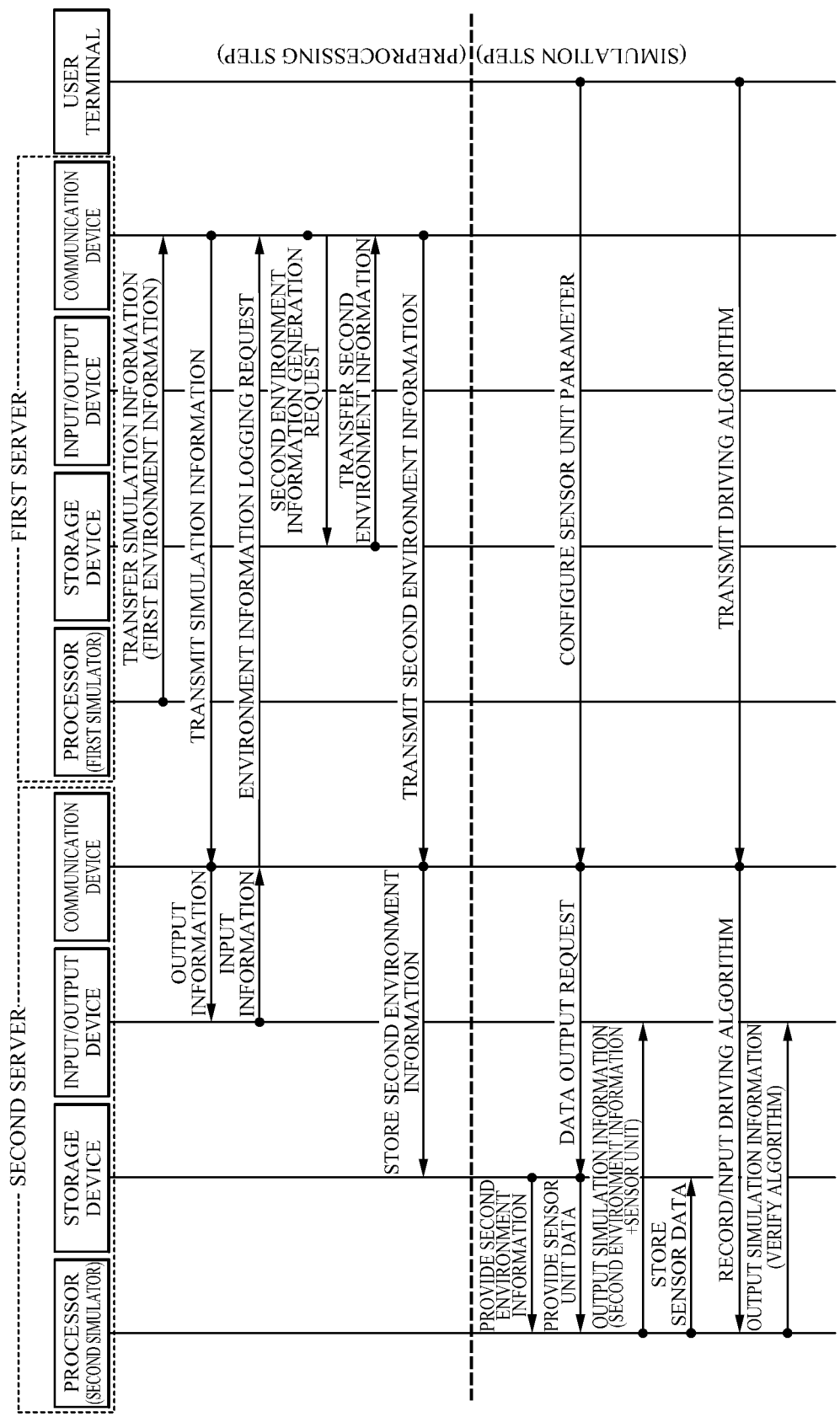
FIGS. 6 and 7 are control flowcharts according to another exemplary embodiment of an autonomous vehicle simulation method.
Figure 7:
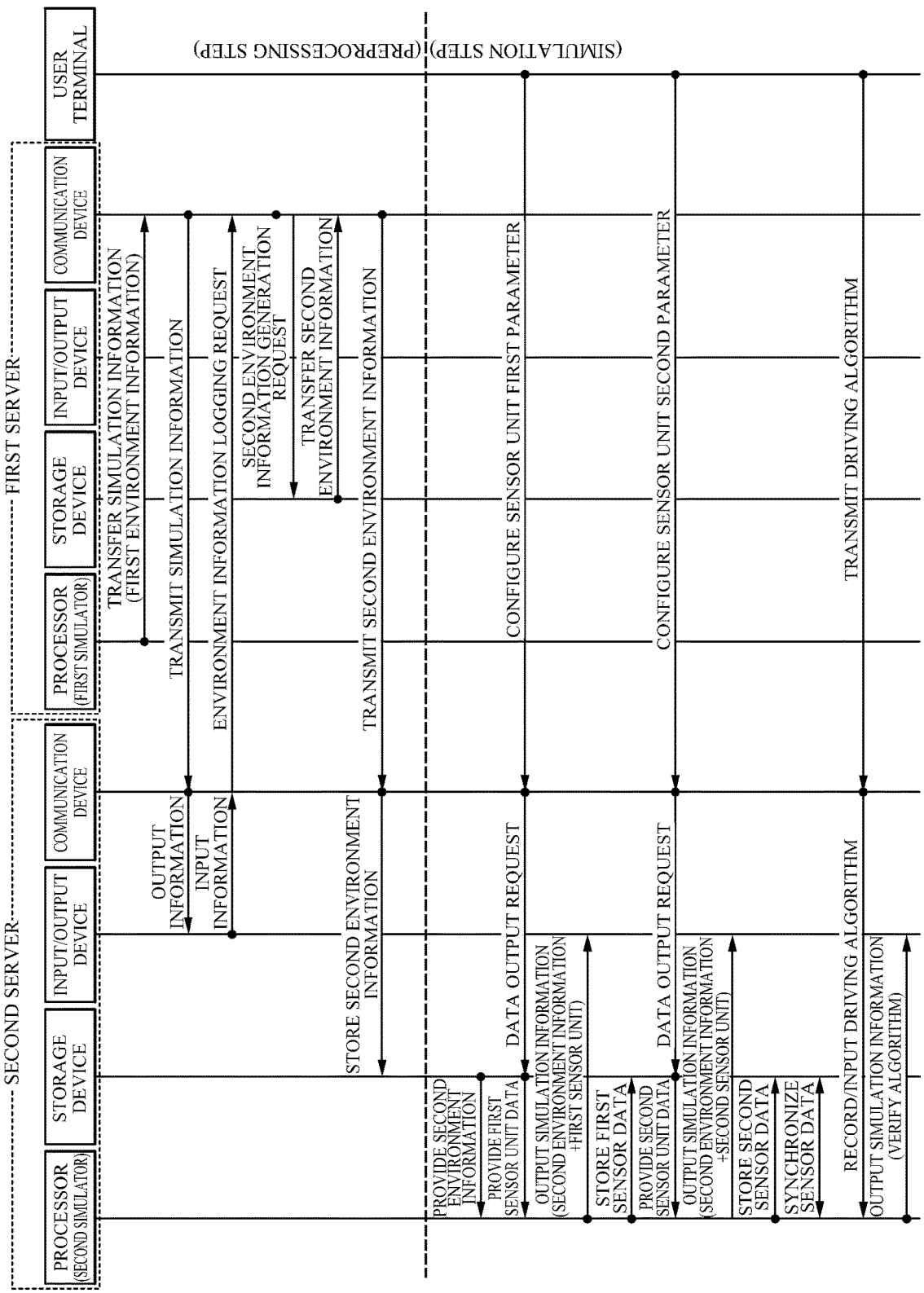

FIGS. 5 to 7 relate to another exemplary embodiment of an autonomous vehicle simulation method according to the present invention, in which FIG. 5 is a system configuration diagram and FIGS. 6 and 7 are control flowcharts of an autonomous vehicle simulation method.

First, referring to FIG. 6, the present invention may include a first server including a storage device that includes first environment information, a simulator, an input/output device, and a communication device. The present invention may also include a second server including a storage device that includes second environment information, a simulator, an input/output device, and a communication device. Here, the second environment information of the second server may be part of the first environment information divided by time from the first environment information of the first server. In addition, the storage devices of the first server and the second server may further include a physics engine for operating the physics-based simulator, and the second server may further include a sensor unit, the virtual sensor replicating an actual sensor, and a driving algorithm that calculates a driving command of the vehicle based on the sensor data.

The first server may convert simulation information according to the first environment information into image data in real time and display the image data through the output device or the communication device. In addition, in the second server, the simulator may be operated based on the second environment information where only situations where portions of the overall data is of high importance. In addition, the second server may convert simulation information according to the second environment information into image data and display the image data through the output device or the communication device of the corresponding server.

The first environment information and the second environment information may include vehicle arrangement, geographical features, event data, pedestrian data, road data, and the like. In addition, the second environment information may include for the selected simulation target at least one of reference road data, nearby vehicle data, nearby pedestrian data, nearby obstacle data, nearby traffic light data, nearby sign data, and event data. The output of the second environment information may be configured as a data set by separately dividing cases where a more minute verification is required such as a case where there is a problem in the driving algorithm of the vehicle which is driving, a case where a pedestrian walks on the road, or an event in which a sudden rockslide occurs, with the user verifying the image output from the first server in real time. In this example, the basis for packaging the data set, may be a displayed time, such as simulator operation time of the first server or RTC.

Next, control between each component will be described in more detail with reference to FIG. 6 as follows. Here, the first server may provide the first environment information stored in the storage device to the first simulator, which is a processor, and the first simulator may transmit simulation information calculated in real time to the output device. Here, the simulation information transmitted from the first simulator may be information which has been converted into image data and may be transmitted to other servers including the second server through the communication device.

Thereafter, the first server may receive an environment information logging request, which is a generation request message for second environment information for the simulation target that includes at least one of road data, nearby vehicle data, nearby pedestrian data, nearby obstacle data, nearby traffic light data, nearby sign data and event data for a predetermined period of time from the input device, another server including the second server, or the user terminal. Here, the first server may separately manage static data that may not be changed during the simulation such as geographical features, road data, and the like and dynamic data that may be changed during the simulation such as vehicle placement, pedestrians, and the like. Here, based on the autonomous vehicle being verified by the user in the simulation image of the first server, the second environment information may include static data within a specific range of the selected autonomous vehicle and dynamic data for a set amount of time. In this manner, the second environment information divided from the first environment information may be transmitted to the communication device of the second server through the communication device of the first server. In addition, the second environment information received from the communication device of the second server may be stored in the storage device or may be provided to the second simulator. Through this process, the simulation preprocessing step may be performed either by storing the divided second environment information in the first server or by transmitting and storing the second environment information to and in the second server.

Also, sensor unit information including sensor unit data stored in a storage device of the second server and the second environment information may be input to the second simulator. In addition, the second simulator may simulate based on the above-described information, convert the information into an image, and output the image. Here, in the present invention, sensor unit parameter configuration information may be received from the user terminal or the sensor unit parameter configuration information may be a message requesting selection from among a plurality of sensor unit, a sensor unit that will be applied to the second simulator. Also, through the above-described process, a simulation step may be performed in which a simulation, using second environment information and sensor unit data, performs simulated driving with the simulation target vehicle. In addition, the sensor unit information may include sensor unit data, which is virtual sensor data that simulates an actual sensor, and may further include at least one of the number, type, specification, and installation position within the vehicle of the sensors included in the sensor unit.

The second simulator of the second server may simulate the received second environment information and the sensor unit data together, and sensor data, which is the output data of the simulated sensor unit of the simulation target vehicle, may be stored in the storage device of the second server. Also, in the present invention, verification on an input driving algorithm may be performed by inputting to the second simulator, a driving algorithm either provided from the user terminal or previously stored in the second server, and then by inputting the above-described sensor data to the driving algorithm. Accordingly, a user may repeatedly verify their algorithm with only a scenario within a relatively reduced set time, instead of testing vast amounts of data and may perform more efficient verification by inputting a variety of driving algorithms. In addition, a plurality of users may access the first server and be provided with only the environment information they need to verify their algorithms.

Next, referring to FIG. 7, in the present invention, a plurality of sensor unit may be provided, and data of each of the plurality of sensor unit may be sequentially calculated in the second simulator. In detail, in the second server, the second simulator may be operated multiple times by varying the number and type of sensor unit based on the same second environment information from the user terminal. Also, first sensor data, second sensor data, and the like, which are the results of each simulation, may be stored in the storage device and may be synchronized with each other. In addition, the second server may input the synchronized sensor data and the second environment information to the second simulator after which the driving algorithm, which is either input from the user terminal or previously stored, may be applied to the simulator to verify the algorithm.

Also, in all of the exemplary embodiments described above, the present invention may include a step for receiving simulation configuration information. Here, the step for receiving the simulation configuration information may be performed before or after the preprocessing step, may be received from the user terminal, and may include at least one of information on a simulation target vehicle, information on a sensor unit of the simulation target vehicle, and information on a vehicle driving algorithm. The simulation target vehicle information may include at least one of a type, shape, size, wheelbase, height, and center of mass of the vehicle, and the sensor unit information of the simulation target vehicle may include at least one of the number, type, specification, and installation position within the vehicle of a sensor included in the sensor unit. In addition, the vehicle driving control algorithm information may be composed of algorithms that calculate driving commands for the vehicle based on output data of the sensor unit of the simulation target vehicle. Here, the driving command of the vehicle may include at least one of acceleration, deceleration, full stop, driving direction, turn indicator, and lighting of the vehicle. Here, the sensor unit information of the simulation target vehicle may be received before the server calculates the sensor unit output data using the second environment information and the sensor unit data, and the vehicle driving control algorithm information may be received before verification in the second simulator. As simulation variables may vary over repeated steps, this process is not intended to be limiting.

Although the exemplary embodiments of the present invention have been illustrated and described hereinabove, the present invention is not limited to the above-mentioned specific exemplary embodiments, but may be variously modified by those skilled in the art to which the present invention pertains without departing from the scope and spirit of the present invention as disclosed in the accompanying claims. These modifications should also be understood to fall within the scope of the present invention.

The invention claimed is:

1. A moving object simulation method comprising:
   (a) a simulation preprocessing step in which a first server generates simulated environment information for simulation target, including at least one of road data, nearby vehicle data, nearby pedestrian data, nearby obstacle data, nearby traffic light data, nearby sign data, and event data for a predetermined period of time; and
   (b) a simulation step in which a second server receives a predetermined vehicle driving control algorithm from a user terminal, calculates sensor unit output data of a simulation target vehicle, according to movement of the simulation target vehicle, for the predetermined period of time using the simulated environment information, obtains a driving command for the simulation target vehicle using the sensor unit output data and the predetermined vehicle driving control algorithm, and verifies the predetermined vehicle driving control algorithm by controlling the simulation target vehicle based on the driving command.

2. The moving object simulation method of claim 1, wherein
   the step (b) is performed after the step (a), the step (a) further includes: a step for storing the simulated environment information, and in the step (b), by using the simulated environment information stored in the step (a), the second server reduces computational processing load for simulation.

3. The moving object simulation method of claim 2, wherein the first server and the second server are the same server.

4. The moving object simulation method of claim 1, wherein the step (a) and the step (b) are simultaneously performed, and the simulated environment information used in the step (b) is received by the second server in real time from the first server, thereby reducing computational processing load of the second server for simulation.

5. The moving object simulation method of claim 4, wherein the first server and the second server are separate servers.

6. The moving object simulation method of claim 1, wherein the simulated environment information includes simulation time data such that the simulation time of the step (a) and the step (b) are synchronized.

7. The moving object simulation method of claim 1, wherein the simulation target vehicle is an autonomous vehicle.

8. The moving object simulation method of claim 1, wherein the sensor unit includes at least one of lidar, radar, GPS, and camera sensors.

9. The moving object simulation method of claim 1, further comprising:
   receiving simulation configuration information including at least one of simulation target vehicle information, and sensor unit information of a simulation target vehicle from the user terminal either before or after the step (a).

10. The moving object simulation method of claim 9, wherein the simulation target vehicle information includes at least one of a type, shape, size, wheelbase, height, and center of mass of a vehicle.

11. The moving object simulation method of claim 9, wherein the sensor unit information of the simulation target vehicle includes at least one of the number, type, specification, and installation position within the vehicle of a sensor included in the sensor unit.

12. The moving object simulation method of claim 1, wherein the driving command of the vehicle includes at least one of acceleration, deceleration, full stop, driving direction, turn indicator, and lighting of the vehicle.

13. The moving object simulation method of claim 1, wherein, in the step (b), driving the simulation target vehicle is controlled based on the calculated output data of the sensor unit of the simulation target vehicle.

14. A moving object simulation system comprising:
   a first server and a second server performing the moving object simulation method according to claim 1.

15. A non-transitory storage medium recording commands for performing the moving object simulation method according to claim 1.

16. The moving object simulation method of claim 1, further comprising:
  outputting verification of the predetermined vehicle driving control algorithm.

17. The moving object simulation method of claim 1, wherein the simulated environment information is a subset of entire environment information stored in a storage device.

18. The moving object simulation method of claim 1, wherein the first server generates the simulated environment information based in a predetermined time reference in response to receiving a logging request from the user terminal.

* * * * *